Aug. 10, 1937.　　　　S. B. NEILEY　　　　2,089,925

RUBBER IMPREGNATED FIBROUS MATERIAL

Filed April 5, 1935

Inventor:
Stephen B. Neiley
By Theodore C. Browne
Attorney.

UNITED STATES PATENT OFFICE 2,089,925

RUBBER IMPREGNATED FIBROUS MATERIAL

Stephen B. Neiley, Winchester, Mass., assignor to Dewey and Almy Chemical Company, North Cambridge, Mass., a corporation of Massachusetts Application April 5, 1935, Serial No. 14,734

6 Claims. (Cl. 91—68)

In the production of artificial leather made from latex rubber impregnated fibrous material, two difficulties are present. First, assuming that the web is a proper base stock to receive impregnants and that the latex is so skillfully compounded as to impregnate the sheet uniformly, both of which are known steps in the art, it still will be found that capillary active forces drag the rubber particles out towards the surface as the latex dries and that the surface portion of the sheet contains more rubber than does the interior. The concentration of rubber may be sufficient to form what may approach a continuous surface film. Pyroxylin, to use this substance as a single example, bonds poorly to a continuous rubber surface, consequently, since most artificial leather is now coated with pyroxylin finishes and grained, the bond of the pyroxylin to the base stock is not secure.

The second difficulty is that the adhesion of the coating may be increased by reducing the rubber content of the whole web, but since many of the desirable characteristics of the artificial leather are imparted by the rubber, this ordinarily is a step in the wrong direction and produces an inferior product.

It is an object of this invention to secure the highest possible degree of adhesion of the coating; to produce a coating receptive surface without relation to the rubber content of the web, and to permit rubber containing webs having high rubber content to be used in coated products. These and other objects will become apparent from the specification and from the drawing in which Figure 1 is a semi-schematic view showing the arrangement of one form of apparatus for the practice of my invention.

Figure 1:
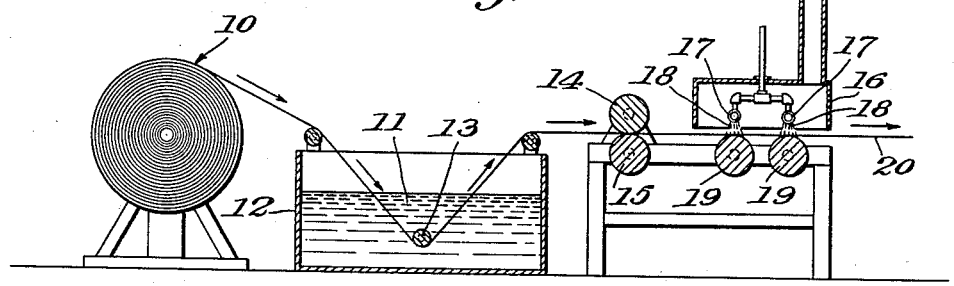

I have discovered that it is possible to produce a localized surface condition of low rubber content having an open, fibrous structure into which the coating may penetrate and bond securely by employing first in the latex a heat dissociable coagulant, such as set forth in my United States Patent, Reissue #19,426 dated, January 15, 1935, then impregnating a specially prepared, impregnant-receptive web therein, subsequently reversing the capillary-active forces which normally cause the rubber to concentrate at the surface and immediately thereafter activating the coagulant by heat to cause the instant coagulation of the rubber latex throughout the web.

I find that this produces a web with as high a rubber content as may be required, but having a fibrous, open surface.

As I set forth in detail in my United States patent mentioned above, I discovered that certain zinc complex ions which dissociate at temperatures higher than normal atmospheric temperatures, but below the boiling point of water, do not coagulate rubber latex until the temperature of the composition is raised above a critical value at which temperature free zinc cations are released which cause coagulation.

Accordingly, in the latex bath, I place a supply of complex zinc cations $(Zn(NH_3)_4^{++})$ in the form of zinc-ammonium chloride, acetate, or benzoate as the patent sets forth.

When the temperature of the whole web rises to 140° F. to 178° F. depending upon the particular salt and its concentration, the complex breaks up, releasing free zinc cations $(Zn^{++})$ and forthwith the latex in the web coagulates.

In my present process, the heating is, however, much more thorough and more suddenly secured than my previous process contemplated or practiced.

I have determined that the instant coagulation brought about by the sudden release of active ions throughout the mass produces a sheet which has greatly increased tear resistance and is practically free from ply separation. For example, if a sheet of water-laid felt or saturating paper be impregnated with normal vulcanizable latex dried and cured, the sheet will separate into plies when torn which correspond to the increments of fiber added to the sheet by the paper-making machine during manufacture. It is my belief that in the case of normal latex the rubber therein is drawn against the individual fibers as the sheet dries, collects at the intersections of the fibers and forms fillets about, and buttresses to the fiber structure. On the other hand, however, by following my process outlined above and incorporating an identical amount of rubber in the same web and then causing the latex to coagulate suddenly in situ before drying and cure, it will be found that the sheet tears directly through its whole body and shows no tendency to separate into plies.

It is known that as rubber latex coagulates, filamentary processes shoot out from the globule, which, meeting others, interlace and build up a reticulated mass. Accordingly, I believe that by my process a second network of rubber tendrils or fibers is built up within the sheet and that this structure is formed substantially without relation to the felt fibers of the web. At any event, however, a very definite reinforcing action occurs which cannot be attributed to the presence of rubber alone and which prevents the separation of the sheet into plies.

Due to the instantaneous coagulation of the rubber latex I find it possible to distribute the rubber nonuniformly throughout the sheet. This may be done by reversing the capillary-active forces, which normally cause the rubber to concentrate at the surface by saturating the surface with a mobile fluid, and immediately thereafter causing coagulation to take place. Coagulated latex will not migrate. I may bring about a reversal of the capillary active forces in a number of ways, but preferably a reversal may be brought about by a higher concentration of liquid at the surface than exists throughout the remainder of the sheet.

In Figure 1 a schematic showing of one machine used in my process, the web 10 is unrolled into the impregnating bath 11 in the tank 12. It passes under the anchor roll 13 and between the adjustable squeeze rolls 14 and 15 (the surplus material removing mechanisms are conventional and not shown). From there, the web passes into a hood 16 in which are one or more transverse pipes 17—17 which bear nozzles 18—18 arranged to throw a uniform spray over the surface 20 of the web. Directly beneath the nozzles are placed the rolls 19—19 which take the thrust of the spray and prevent the weak web from being punctured or torn. The web then passes to a conventional drier and reeling apparatus.

As taught in my United States patent to which I have referred, the latex bath 11 contains in solution a complex salt, preferably zinc ammonium chloride, acetate or benzoate (although for special purposes other complex salts may be used), the concentration of the zinc cations of which is about one third of one per cent of the total mass.

A water solution of the same salt at the same mass concentration is sprayed out through the nozzles 18—18. My reason for adding the salt to the spray water is to maintain the mass concentration of potential coagulant substance constant throughout and thereby to assure the coagulation of the latex at one certain temperature. The web now has its upper surface 20 drenched with this solution and not only is the latex in the surface layer diluted but, I believe, the capillary-active forces are reversed and the latex is dragged thereby back into the web. There is, also, a scouring action due to the force of the solution itself. All these effects build up to produce a surface layer 21 (Fig. 3) of the web which is practically denuded of latex. Then as the web passes onto the drier it absorbs heat, the complex salt dissociates, releasing active cations both in the layer 21 and in the body portion 22 (Fig. 3) of the web and immediately the latex coagulates leaving the surface 21 permanently quite rubber-free.

The drier heat may be adjusted to cure the dried latex which is now non-uniformly distributed in the web if proper vulcanizing and accelerating ingredients have been added.

In an alternative procedure, which may be illustrated by the same diagram (Figure 1), the web 10 is unrolled into the impregnating bath 11 as before, but instead of forcing a water solution of a complex salt through the nozzles 18—18, I now blow a jet of saturated steam through these and onto the latex impregnated web. The entrained water and condensate from the steam soak the surface layer 21 of the web as before and since heat is being carried into the web by the steam, coagulation starts more quickly, but after the latex has been dragged away from the surface layer. I have, in consequence, not found it essential to maintain the concentration of coagulant constant throughout the mass, which is necessary when cool water is used.

The pressure of the steam, the amount of entrained water, the speed of the travelling web, and the concentration of the coagulant are all process variables which depend upon the absorptivity of the web and the type of product one desires to produce. Accordingly I give no definite values but state that with a definite end product in mind, they may easily be determined by experiment.

Although I prefer to reduce the rubber content of the surface layer by means of the steam blast since I have found that this permits a more accurate process, I have produced a satisfactory sheet with a surface layer practically denuded of rubber without recourse to mechanical forces released from the steam blast or from the water spray.

Figure 2:
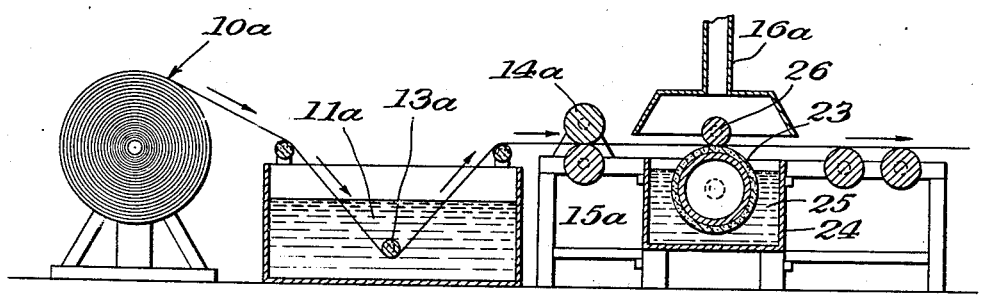
Fig. 2 is also a semi-schematic view and illustrates an alternative form of apparatus.

Yet a third modification of my process is illustrated in Fig. 2. The web 10a is unrolled into a latex bath 11a which contains a "dormant coagulant" of the same class as before. It passes under the anchor roll 13a and between the squeeze-rolls 14a and 15a. From there it passes under the hood 16a and over a roll 23 which revolves in a tank 24 of hot zinc ammonium chloride, acetate, or benzoate solution 25. The pressure roll 26 insures the full contact of the web 10a with the roll 23.

The salt in the solution 25 is the active coagulating product of the dormant coagulant used in the latex bath 11a and its concentration is of such an amount as will equal that of the coagulant when dissociated in the latex. In this case, also, before coagulation occurs, a substantial quantity of latex has been removed from the surface.

Figure 3:
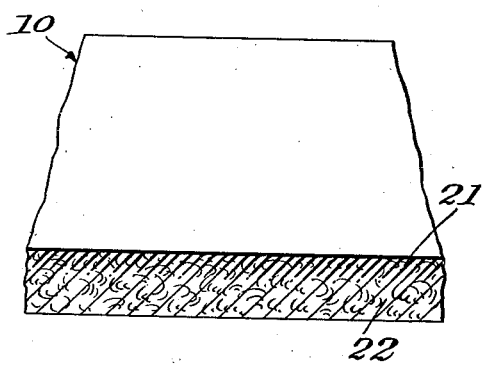
Fig. 3 is an enlarged view, partially in section, showing my improved web.

Figure 3 shows, partially in cross section, the web 10 having a high rubber body portion 22 and a low rubber surface layer 21.

Although the web is designed for coating and finds its greatest utility in this form, I desire to point out that coating is generally carried on as a separate business and that a web having a coating receptive surface is an article of commerce by itself.

Figure 4:
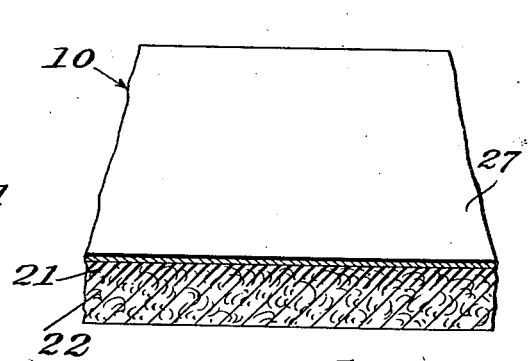
Fig. 4 is an enlarged view, partially in section showing the completed product, a coated web.

The finished product is illustrated in Fig. 4. In addition to the web 10, with its high rubber body portion 22, and its low rubber surface layer 21, the sheet carries a coating 27 of pyroxylin, casein, resins, oxidized oil, glue or other well known finish. Also it may be grained to simulate leather. Whatever the coating, however, it penetrates and impregnates the layer 21, and in this manner is securely bonded to the sheet.

This process is applicable to any of the lattices now available. This includes not only latex derived from Hevea Brasiliensis, but other like natural lattices and artificial water dispersions of rubber and analogous substances.

What I claim is:

1. That process of producing a non-uniform distribution of rubber in a latex-impregnated web which comprises saturating a web with latex, forcing the rubber constituents of the latex to migrate away from one surface of the web and a layer adjacent thereto and into the body of said web, coagulating the latex by release of an active coagulant distributed throughout the web and finally drying the web.

2. That process of producing a non-uniform distribution of rubber in a latex-impregnated web which includes impregnating a web with latex, treating a surface of the web to reverse the capillary-active forces normally tending to concentrate rubber at the surface thereof, thereby removing latex from the surface and a layer adjacent thereto, coagulating the latex in the web, and thereafter drying the product.

3. That process of producing an impregnated web having a surface layer of low rubber content which includes the steps of impregnating a web in a latex bath containing a heat dissociable complex salt, drenching a surface of the web with a water solution of the same heat dissociable complex salt and heating the web, thereby dissociating the salt and coagulating the latex by the dissociation products of the salt.

4. That process of producing an impregnated web having a surface of low rubber content which includes the steps of impregnating a web in a latex bath, blowing steam upon a surface of the web, thereby removing latex from a layer adjacent the surface, coagulating the latex, and drying the product.

5. That process of producing an impregnated web having a reduced rubber content adjacent its surface which includes the steps of impregnating a web with latex, saturating the surface layer of the web with water to remove latex from the layer, coagulating the latex and drying the product.

6. The method of causing the rubber latex, which normally would concentrate at the surface of a wet, latex impregnated web, to re-enter the body of the web which includes the step of saturating one surface of the impregnated web with an aqueous fluid, whereby the rubber constituents of the latex are caused to migrate away from the saturated surface.

STEPHEN B. NEILEY.